United States Patent
Wang et al.

(10) Patent No.: US 11,341,769 B2
(45) Date of Patent: May 24, 2022

(54) FACE POSE ANALYSIS METHOD, ELECTRONIC DEVICE, AND STORAGE MEDIUM

(71) Applicant: BEIJING SENSETIME TECHNOLOGY DEVELOPMENT CO., LTD., Beijing (CN)

(72) Inventors: Quan Wang, Beijing (CN); Fei Wang, Beijing (CN); Chen Qian, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 31 days.

(21) Appl. No.: 16/823,392

(22) Filed: Mar. 19, 2020

(65) Prior Publication Data

US 2020/0218883 A1   Jul. 9, 2020

Related U.S. Application Data

(63) Continuation of application No. PCT/CN2018/123156, filed on Dec. 24, 2018.

(30) Foreign Application Priority Data

Dec. 25, 2017   (CN) .................. 201711424986.5

(51) Int. Cl.
*G06K 9/00* (2022.01)
*G06K 9/62* (2022.01)
(Continued)

(52) U.S. Cl.
CPC ......... *G06V 40/165* (2022.01); *G06K 9/6257* (2013.01); *G06K 9/6263* (2013.01);
(Continued)

(58) Field of Classification Search
CPC .......... G06K 9/00248; G06K 9/00214; G06K 9/00308; G06K 9/00382; G06K 9/00845;
(Continued)

(56) References Cited

U.S. PATENT DOCUMENTS

2006/0011399 A1   1/2006   Brockway
2008/0130961 A1   6/2008   Kinoshita
(Continued)

FOREIGN PATENT DOCUMENTS

CN   103605965 A   2/2014
CN   105096528 A   11/2015
(Continued)

OTHER PUBLICATIONS

Le Zhang et al., "Head Pose Estimation Based on Feature Extraction, Fuzzy C-Means and Neural Network for Driver Assistance System," 2014, 11th IEEE International Conference on Control & Automation (ICCA), pp. 677-682 (6 pages) (Year: 2014).*
(Continued)

*Primary Examiner* — David F Dunphy
(74) *Attorney, Agent, or Firm* — Cooper Legal Group, LLC

(57) ABSTRACT

A face posture analysis method, an electronic device, and a computer-readable storage medium are provided. The face posture analysis method includes: obtaining a face key point of a to-be-processed face image; and inputting the face key point of the to-be-processed face image into a neural network, to obtain face posture information of the to-be-processed face image output by the neural network.

18 Claims, 5 Drawing Sheets

---

S300. Obtain a face key point of a face image sample

S310. Determine face posture annotation information of the face image sample by using a three-dimensional face model according to the face key point of the face image sample S320. Use the face posture information of the face image sample as face posture annotation information of the face image sample, and add the face posture information to a training data set as one piece of training data together with the face key point of the face image sample

(51) Int. Cl.
    *G06N 3/04*    (2006.01)
    *G06N 3/08*    (2006.01)
    *G06V 40/16*   (2022.01)
    *G06V 20/59*   (2022.01)
    *G06V 20/64*   (2022.01)
    *G06V 40/10*   (2022.01)

(52) U.S. Cl.
    CPC .............. *G06N 3/04* (2013.01); *G06N 3/08* (2013.01); *G06V 20/597* (2022.01); *G06V 20/653* (2022.01); *G06V 40/11* (2022.01); *G06V 40/175* (2022.01)

(58) Field of Classification Search
    CPC ...... G06K 9/6257; G06K 9/6263; G06N 3/04; G06N 3/08
    See application file for complete search history.

(56) References Cited

U.S. PATENT DOCUMENTS

| | | | | |
|---|---|---|---|---|
| 2014/0204193 | A1* | 7/2014 | Zhang | G06K 9/00597 348/78 |
| 2018/0032828 | A1* | 2/2018 | Wang | G06K 9/00288 |

FOREIGN PATENT DOCUMENTS

| | | |
|---|---|---|
| CN | 105354565 A | 2/2016 |
| CN | 105389570 A | 3/2016 |
| CN | 105719248 A | 6/2016 |
| CN | 105760836 A | 7/2016 |
| CN | 106203376 A | 12/2016 |
| CN | 106257489 A | 12/2016 |
| CN | 106339680 A | 1/2017 |
| CN | 106384098 A | 2/2017 |
| CN | 106651910 A | 5/2017 |
| CN | 106909879 A | 6/2017 |
| CN | 107038429 A | 8/2017 |
| CN | 107194381 A | 9/2017 |
| CN | 107609519 A | 1/2018 |
| JP | 2008226163 A | 9/2008 |
| JP | 2011086265 A | 4/2011 |
| WO | 2017040519 A1 | 3/2017 |

OTHER PUBLICATIONS

Specht, "A General Regression Neural Network", 1991, IEEE Transactions on Neural Networks. vol. 2 . No. 6., pp. 568-576 (9 pages) (Year: 1991).*

Qiang Ji et al, "Real-Time Nonintrusive Monitoring and Prediction of Driver Fatigue," 2004, IEEE Transactions on Vehicular Technology, vol. 53, No. 4, pp. 1052-1068 (17 pages) (Year: 2004).*

"Face Pose Estimation Based on Elliptical Model and Neural Network"; 2008; Liu Miao, Guo Dong-Wei, Ma Jie, Sun Hao-Xiang, Zhou Chun-Guang; Journal of Jilin University (Science Edition), vol. 46, No. 4, 5 pgs.

"Research on Single-View and Multi-Pose Face Recognition"; Mar. 2016; Zhang Haibo; A Master Thesis submitted to University of Electronic Science and Technology of China, 73 pgs.

First Office Action of the Chinese application No. 201711424986.5, dated Sep. 15, 2020, 25 pgs.

International Search Report in the international application No. PCT/CN2018/123156, dated Apr. 8, 2019, 3 pgs.

English translation of the Written Opinion of the International Search Authority in the international application No. PCT/CN2018/123156, dated Apr. 8, 2019, 4 pgs.

First Office Action of the Japanese application No. 2020-537835, dated May 11, 2021, 6 pgs.

Written Opinion of the Singaporean application No. 11202002740S, dated May 18, 2021, 7 pgs.

"Feature-based Head Pose Estimation from Images", 2007, Teodora Vatahska, Maren Benewitz and Sven Behnke, 2007 7th IEEE-RAS International Conference on Humanoid Robots, pp. 330-335.

"Fast Face Alignment Method Based on Sparse Cascade Regression and its Application on Mobile Devices", Oct. 2015, Jian Kang-Deng, Jing Yang, Yu-Bao Sun and Qing-Shan Liu, Computer Science, vol. 42, No. 10, 6 pgs.

"The Algorithm Research of Face Pose Estimation based on Multi-Layer Random Forests Classification", Dec. 2015, Hou Haina, Dissertation Submitted to Hebei University of Technology for the Master Degree of Control Science and Engineering, 62 pgs.

* cited by examiner

US 11,341,769 B2

FACE POSE ANALYSIS METHOD, ELECTRONIC DEVICE, AND STORAGE MEDIUM

CROSS REFERENCE OF RELATED APPLICATIONS

The present application is a continuation of International Patent Application No. PCT/CN2018/123156, filed on Dec. 24, 2018, which claims priority to Chinese Patent Application No. 201711424986.5, filed on Dec. 25, 2017. The disclosures of Patent Application No. PCT/CN2018/123156 and Chinese Patent Application No. 201711424986.5 are hereby incorporated by reference in their entireties.

BACKGROUND

A face image is an image that includes a face. How to obtain more information from the face image is one technical problem of concern.

SUMMARY

The present disclosure relates to computer vision technologies, and in particular, to a face posture analysis method, an electronic device, and a computer readable storage medium.

Implementations of the present disclosure provide technical solutions for face posture analysis, neural network training, and driving state monitoring.

A face posture analysis method provided according to one aspect of the implementations of the present disclosure includes: obtaining a face key point of a face image; and inputting the face key point of the face image into a neural network, to obtain face posture information of the face image output by the neural network.

An electronic device provided according to yet another aspect of the implementations of the present disclosure includes: a memory, configured to store computer programs; and a processor, configured to execute the computer programs stored in the memory, where the computer programs, when being executed by the processor, causes the processor to implement the face posture analysis method as described above in the present disclosure.

A computer-readable storage medium provided according to yet another aspect of the implementations of the present disclosure stores computer programs, and the computer programs, when being executed by a processor, implement the face posture analysis method as described above in the present disclosure.

According to the face posture analysis method, the electronic device, and the computer-readable storage medium that are provided by the present disclosure, in the present disclosure, face posture information of a to-be-processed face image is extracted by using a neural network, so that the face posture information of the to-be-processed face image can be quickly and accurately obtained. The technical solution of face posture analysis in the present disclosure is conducive to satisfy the requirement for extracting the face posture information of the to-be-processed face image in real time, so that the technical solution of extracting the face posture information in the present disclosure can be applied to a real-time environment.

It should be understood that the general description above and the detailed description below are merely exemplary and explanatory, and are not intended to limit the present disclosure. The technical solutions of the present disclosure are further described below in detail with reference to the accompanying drawings and embodiments.

BRIEF DESCRIPTION OF THE DRAWINGS

The accompanying drawings constituting a part of the specification describe the implementations of the present disclosure and are intended to explain the principles of the present disclosure together with the descriptions. According to the following detailed description, the present disclosure may be understood more clearly with reference to the accompanying drawings.

DETAILED DESCRIPTION

Figure 1:
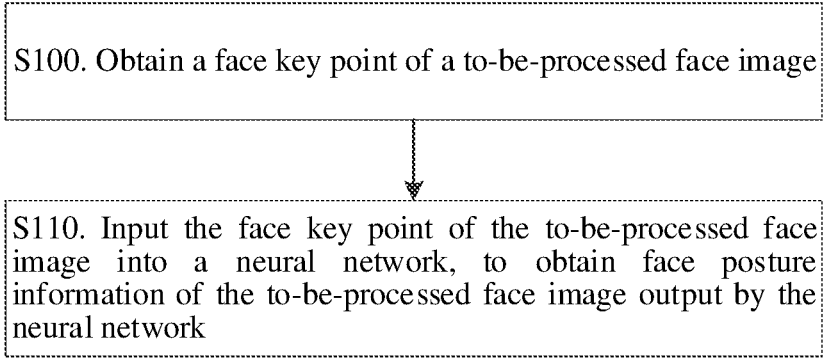
FIG. 1 is a flowchart of implementations of a face posture analysis method according to the present disclosure.

Various exemplary embodiments of the present disclosure are now described in detail with reference to the accompanying drawings. It should be noted that, unless otherwise stated specifically, relative arrangement of the components and operations, the numerical expressions, and the values set forth in the embodiments are not intended to limit the scope of the present disclosure. In addition, it should be understood that, for ease of description, the size of each part shown in the accompanying drawings is not drawn in actual proportion.

The following descriptions of at least one exemplary embodiment are merely illustrative actually, and are not intended to limit the present disclosure and applications or uses thereof. Technologies, methods, and devices known to a person of ordinary skill in the related art may not be discussed in detail, but such technologies, methods, and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The electronic devices such as the terminal devices, computer systems, and servers may be described in the general context of computer system executable instructions (for example, program modules) executed by the computer systems. Generally, the program modules may include routines, programs, target programs, components, logics, data structures, and the like for performing specific tasks or implementing specific abstract data types. The computer systems/servers may be practiced in the distributed cloud computing environments in which tasks are performed by remote processing devices that are linked through a communications network. In the distributed computing environments, the program modules may be located in local or remote computing system storage media including storage devices.

EXEMPLARY EMBODIMENTS

A face posture analysis method, a neural network training method, and a driving state monitoring method provided according to the present disclosure are executed by a data processing device such as a single-chip microcomputer, a Field Programmable Gate Array (FPGA), a Central Processing Unit (CPU), and a microprocessor by invoking corresponding instructions stored in a memory.

FIG. 1 is a flowchart of embodiments of a face posture analysis method according to the present disclosure. As shown in FIG. 1, the method according to the embodiments includes operations of S100 and S110. The operations in FIG. 1 are described in detail below.

At S100, a face key point of a to-be-processed face image is obtained.

In optional examples, the to-be-processed face image in the present disclosure may be an image that presents a static picture, photo, or the like, or may be a video frame that presents a dynamic video, or the like. The to-be-processed face image may be pre-captured by a capture device such as a camera, or may be processed in real time by using the technical solutions in the present disclosure while being captured A face in the to-be-processed face image may be a front face, or may be a non-front face that has a deflection angle. The deflection angle of the non-front face in the present disclosure may be represented by at least one of Pitch (that is, a deflection angle generated by rotating around an x-axis), Yaw (that is, a deflection angle generated by rotating around a y-axis), or Roll (that is, a deflection angle generated by rotating around a z-axis). A specific presentation form of the face in the to-be-processed face image is not limited in the present disclosure.

In optional examples, the face key point in the present disclosure generally refers to multiple points that are used to locate the face or a local face area or at least one face organ. The face key point generally includes, but is not limited to, a face contour key point, an eye key point, an eyebrow key point, a mouth key point, a nose key point, an eyelid line key point, a lip line key point, and the like. In the present disclosure, the face key point of the to-be-processed face image may be obtained by using an existing convolutional neural network. For example, the to-be-processed face image is input into a convolutional neural network, and the face key point of the to-be-processed face image is obtained according to an output of the convolutional neural network. A network structure of the convolutional neural network may be flexibly designed according to an actual requirement for extracting the face key point. A specific network structure of the convolutional neural network is not limited in the embodiments of the present disclosure. For example, the convolutional neural network in the present disclosure may include, but is not limited to, a convolutional layer, a nonlinear Rectified Linear Unit (Relu) layer, a pooling layer, a fully connected layer, and the like. The more layers the convolutional neural network includes, the deeper the network is. For another example, the network structure of the convolutional neural network in the present disclosure may be, but is not limited to, a network structure used by a neural network such as ALexNet, a Deep Residual Network (ResNet), or a Visual Geometry Group Network (VGGnet).

In optional examples, the quantity of the obtained face key points of the to-be-processed face image in the present disclosure may be generally not less than 21. When the quantity of the obtained face key points is greater than 21, face posture information of the to-be-processed face image finally determined in the present disclosure may be generally more accurate. For example, the accuracy of face posture information of the to-be-processed face image obtained by using 106 face key points is generally higher than the accuracy of face posture information of the to-be-processed face image obtained by using 21 face key points. The quantity of obtained face key points is not limited in the present disclosure. The face key point of the to-be-processed face image obtained in the present disclosure generally includes the serial number of the face key point and two-dimensional coordinates, that is, an x-axis coordinate and a y-axis coordinate, of the face key point in the entire to-be-processed face image or a face area in the to-be-processed face image.

At S110, the face key point of the to-be-processed face image is input into a neural network, to obtain face posture information of the to-be-processed face image output by the neural network.

In optional examples, the neural network in the present disclosure is a neural network successfully trained by using a training data set that includes multiple pieces of training data. One piece of training data in the training data set generally includes a face key point of a face image sample and face posture annotation information of a face image sample. For the process of training the neural network by using the training data set, reference may be made to descriptions in FIG. 2. Details are not described here.

In optional examples, the neural network in the present disclosure may include at least two fully connected layers with a Relu and one fully connected layer that is used as an output layer. For example, the neural network includes three layers: the first layer is a fully connected layer with a Relu, the second layer is a fully connected layer with a Relu, and the third layer is a fully connected layer that is used as an output layer. For another example, the neural network includes four layers: the first layer is a fully connected layer with a Relu, the second layer is a fully connected layer with a Relu, the third layer is a fully connected layer with a Relu, and the fourth layer is a fully connected layer that is used as an output layer. The quantity of the fully connected layers included in the neural network is not limited in the present disclosure.

In optional examples, the face posture information in the present disclosure is information used to describe a face deflection direction. Because the face deflection direction may represent a head posture, the face posture information may be referred to as head posture information. Optionally, the face posture information may include one or more of X-axis rotation information, Y-axis rotation information, and Z-axis rotation information. Generally, the X-axis rotation information may be an angle of rotation around the X-axis (which may be referred to as Pitch or a head pitch angle, indicating a raising/lowering angle of the head), the Y-axis rotation information may be an angle of rotation around the Y-axis (which may be referred to as Yaw or a side face angle, indicating an angle of deflection of the face to the left/right), and the Z-axis rotation information may be an angle of rotation around the Z-axis (which may be referred to as Roll or an angle of turning the head to the left/right, indicating an angle by which the top of the head approaches the left/right shoulder). In the embodiments of the present disclosure below, an example in which the face posture information includes Pitch, Yaw, and Roll is used as an example for description. However, this does not indicate that the face posture information in the present disclosure must include Pitch, Yaw, and Roll. In addition, the symbol "/" in the present disclosure means "or".

It should be specially noted that in the present disclosure, the X-axis rotation information, the Y-axis rotation information, and the Z-axis rotation information may also be represented by information in other forms that represent a rotation amount. For example, the X-axis rotation information may be specifically a radian of rotation around the X-axis, the Y-axis rotation information may be specifically a radian of rotation around the Y-axis, and the Z-axis rotation information may be specifically a radian of rotation around the Z-axis. Specific expression forms of the X-axis rotation information, the Y-axis rotation information, and the Z-axis rotation information are not limited in the present disclosure.

In optional examples, in the present disclosure, after the face key point of the to-be-processed face image is obtained, coordinate normalization processing may be first performed on the face key point of the to-be-processed face image, so that a value range of the x-axis coordinate and the y-axis coordinate of the face key point is [1, −1], facilitating the neural network performing an operation of extracting the face posture information. Then, the face key point subjected to the coordinate normalization processing is input into the neural network, so that the neural network outputs Pitch, Yaw, and Roll of the to-be-processed face image according to the face key point subjected to the coordinate normalization processing.

In the present disclosure, the face posture information of the to-be-processed face image is extracted by using the neural network, so that the face posture information of the to-be-processed face image may be quickly and accurately obtained, thereby avoiding the problems of large calculation amount, high calculation complexity, long time consumption and the like when the face posture information of the to-be-processed face image is obtained by optimizing the distance based on a three-dimensional face model and a gradient descent method. Therefore, the technical solution of face posture analysis in the present disclosure is conducive to satisfy the requirement of extracting the face posture information of the to-be-processed face image in real time, thereby facilitating application in a real-time environment.

The extracted face posture information in the present disclosure is conducive to accurate drawing of a face shape. For example, the extracted face posture information in the present disclosure may be used to assist in establishing a 3D face model, may be used for line of sight analysis, or may be used to screen visible/invisible face key points, and the like. In view of the above, the face posture analysis technology in the present disclosure may be applicable to applications such as face image rendering processing (for example, special effect processing for eyebrows and the like), face changing processing (for example, deformation processing for corresponding face organs), face beautification processing (for example, wrinkle and freckle removal processing and the like), makeup processing (for example, eyebrow drawing processing and the like), face recognition, face state detection processing (for example, determining an opening/closing degree of the eye/mouth and the like), fine positioning processing of organs (for example, eyelid line positioning, inner/outer lip line positioning for an upper/lower lip and the like), and expression detection processing (for example, determining an opening/closing degree of the eye/mouth and the like). In addition, the face posture analysis technology in the present disclosure may be further applicable to an application for driving state determining processing (for example, determining a distracted driving state or a fatigue driving state and the like).

Figure 2:
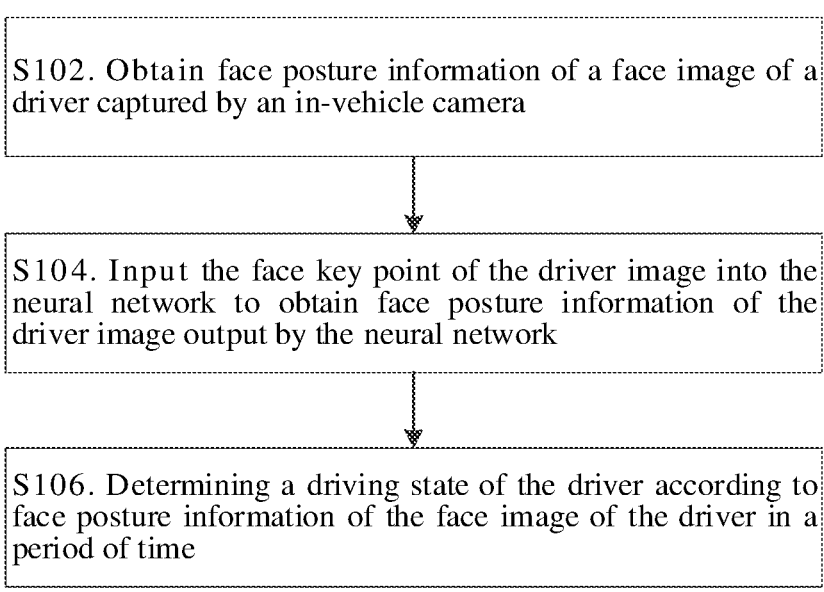
FIG. 2 is a flowchart of a process of monitoring a driving state by using a face posture analysis method of FIG. 1 according to the present disclosure.

FIG. 2 is a flowchart of a process of monitoring a driving state by using a face posture analysis method of FIG. 1 according to the present disclosure. As illustrated in FIG. 2, the process may include operations of S102, S104 and S106. The operations in FIG. 1 are described in detail below.

At S102, a driver image (for example, a driver image that includes a driver face) captured by an in-vehicle camera is obtained, and a face key point of the driver image is obtained. For example, the driver image is input to a convolutional neural network, to obtain the face key point of the driver image output by the convolutional neural network.

At S104, the face key point of the driver image is input into the neural network in the present disclosure, to obtain face posture information of the driver image output by the neural network. For example, Pitch, Yaw, and Roll of the driver image that are output by the neural network are obtained.

At S106, the driving state of a driver is determined according to the face posture information of the driver image in a period of time. For example, when it is determined, according to Pitch, Yaw, and Roll of the driver image in the period of time, that a deflection angle and a deflection duration of the driver's head in at least one direction satisfy a preset condition, it may be determined that the driver is in a distracted driving state or a fatigue driving state.

In optional examples, in the process of determining the driving state in the present disclosure, determining the driving state may be further performed by combining at least one of the hand, the eye, or the mouth of the driver, thereby facilitating more accurate and detailed determining of the driving state.

In optional examples, in the present disclosure, an eye opening/closing action of the driver may be determined according to the face key point of the driver image in the period of time, and then the driving state of the driver is determined according to the face posture information of the driver image in the period of time and the eye opening/closing action. For example, when it is determined, according to the driver image in the period of time, that a head lowering angle (Pitch) and a lowering duration of the driver satisfy a preset condition, and the duration in which the eyes are in a closed or semi-closed state reaches a threshold, it is determined that the driver is in a fatigue driving state.

In other optional examples, in the present disclosure, a mouth opening/closing action of the driver may be determined according to the face key point of the driver image in the period of time, and then the driving state of the driver is determined according to the face posture information of the driver image in the period of time and the mouth opening/closing action. For example, when it is determined, according to the driver image in the period of time, that a deflection angle (Yaw) and a deflection duration of the driver's head to the left/right satisfy a preset condition, and the number of times that the mouth is open or closed reaches a threshold, it is determined that the driver is in a distracted driving state.

In other optional examples, in the present disclosure, a staying state of the driver's hand on a face area may be determined according to a hand key point of the driver image in the period of time, and then the driving state of the driver is determined according to the face posture information of the driver image in the period of time and the staying state. For example, when it is determined, according to the driver image in the period of time, that a side deviation angle (Roll) or a head lowering angle (Pitch) obtained when the driver's head approaches one shoulder satisfies a preset condition, and the duration in which a hand stays near an ear or mouth area reaches a threshold, it is determined that the driver is in a distracted driving state.

In other optional examples, a face orientation of the driver is determined according to the face key point of the driver image in the period of time. For example, the face orientation may be determined according to a visible face key point and an invisible face key point. Then, the driving state of the driver is determined according to the face posture information of the driver image in the period of time and the face orientation. For example, when it is determined, according to the driver image in the period of time, that a deflection angle (Yaw) and a deflection duration of the driver's head to the left/right satisfy a preset condition, and the face also continuously faces towards the left/right, it is determined that the driver is in a distracted driving state.

In addition, in the present disclosure, determining conditions used for determining in the several optional examples above may be combined. For example, when it is determined, according to the driver image in the period of time, that a side deviation angle (Roll) or a head lowering angle (Pitch) obtained when the driver's head approaches one shoulder satisfies a preset condition, a duration in which a hand stays near an ear area or a mouth area reaches a threshold, and the number of times that the mouth is open or closed reaches a threshold, it is determined that the driver is in a distracted driving state of using a mobile phone.

In optional examples, in the present disclosure, in response to a fact that the driving state of the driver satisfies a predetermined alarm condition (for example, the driver is in a severely distracted driving state or in a severely tired driving state), a corresponding operation may be performed, to facilitate safe driving. For example, an operation of outputting alarm prompt information is performed. For another example, an operation of sending information to a cloud server or a predetermined associated communication terminal (such as a mobile phone of the driver or a mobile phone of a driver manager) is performed. The information sent in the present disclosure may include the driving state of the driver, at least one driver image frame corresponding to the driving state of the driver, and the like.

Figure 3:
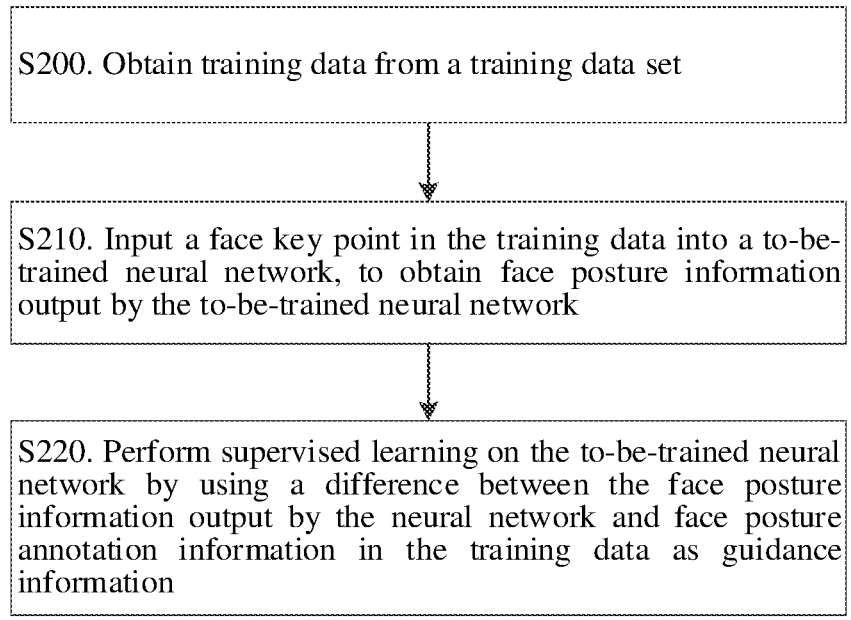
FIG. 3 is a flowchart of a neural network training method according to the present disclosure.

FIG. 3 is a flowchart of one embodiment of neural network training according to the present disclosure. As shown in FIG. 3, the method according to the embodiments includes operations of S200, S210, and S220. The operations in FIG. 3 are described in detail below.

At S200, training data is obtained from a training data set.

In optional examples, the training data set in the present disclosure includes multiple pieces of training data that are used to train a neural network, and one piece of training data may include face key points (for example, 21, 36, 106, or 160 face key points) of a face image sample and face posture information (for example, Pitch, Yaw, and Roll) of the face image sample. In the present disclosure, one or more pieces of training data may be read from the training data set at a time at random or according to a sequence of the training data. For a manner of generating the training data in the training data set, reference may be made to descriptions for FIG. 4. Details are not described here.

At S210, a face key point of the face image sample in the training data is input into a to-be-trained neural network, to obtain face posture information of the face image sample output by the to-be-trained neural network.

In optional examples, when the face key point of the face image sample in the training data is a face key point subjected to coordinate normalization processing, in the present disclosure, the face key point may be directly input into the to-be-trained neural network, and the neural network outputs one or more of X-axis rotation information, Y-axis rotation information, and Z-axis rotation information. When the face key point of the face image sample in the training data is not a face key point subjected to coordinate normalization processing, in the present disclosure, coordinate normalization processing may be first performed on the face key point, and then the face key point subjected to coordinate normalization processing is input into the neural network, and the neural network outputs one or more of X-axis rotation information, Y-axis rotation information, and Z-axis rotation information. Generally, the neural network outputs Pitch, Yaw, and Roll for the input face key point.

At S220, supervised learning is performed on the to-be-trained neural network by using a difference between the face posture information of the face image sample output by the neural network and face posture annotation information of the face image sample in the training data as guidance information.

In optional examples, in the present disclosure, network parameters (such as a convolutional core parameter and a weight value) in the to-be-trained neural network may be adjusted to reduce a difference between Pitch, Yaw, Roll output by the to-be-trained neural network and Pitch, Yaw, and Roll in the training data. This training process ends when an iteration condition is reached. The iteration condition in the present disclosure may include: the difference between Pitch, Yaw, and Roll output by the to-be-trained neural network and Pitch, Yaw, and Roll in the training data satisfies a predetermined difference requirement, and the training of the to-be-trained neural network is successfully completed when the difference satisfies the predetermined difference requirement. The iteration condition in the present disclosure may also include that the amount of training data used for training the neural network satisfies a predetermined amount requirement, and the like. When the amount of used training data satisfies the predetermined amount requirement, but the difference does not satisfy the predetermined difference requirement, the training of the to-be-trained neural network fails. The successfully trained neural network may be used to extract face posture information from a to-be-processed face image.

Figure 4:
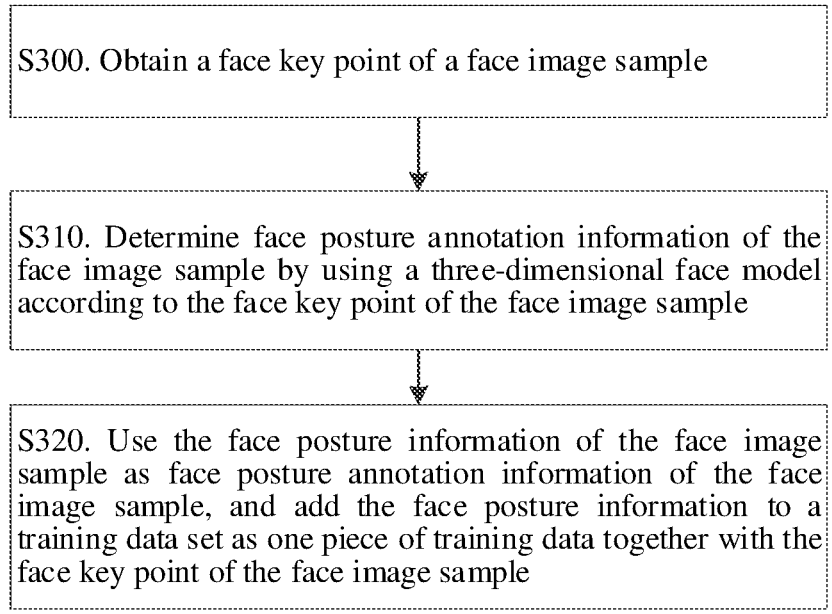
FIG. 4 is a flowchart of implementations of forming training data according to the present disclosure.

FIG. 4 is a flowchart of one embodiment of forming training data in a training data set according to the present disclosure. As shown in FIG. 4, the method according to the embodiments includes operations of S300, S310, and S320. The operations in FIG. 4 are described in detail below.

At S300, a face key point of a face image sample is obtained.

In optional examples, the face key point of the face image sample may be obtained by using an existing convolutional neural network. For example, the face image sample is input into a convolutional neural network, and the face key point of the face image sample is obtained according to an output of the convolutional neural network. In addition, the face key point of the face image sample obtained in the present disclosure may also be a face key point manually annotated for the face image sample.

At S310, face posture annotation information of the face image sample is determined by using a three-dimensional face model according to the face key point of the face image sample.

In optional examples, in the present disclosure, the face posture information corresponding to the face key point of the face image sample is determined based on a pre-established three-dimensional face model. The three-dimensional face model has face key points, for example, 21, 106, 240, or other quantity of face key points. In the present disclosure, a parameter of the three-dimensional face model may be adjusted, to improve a degree of matching between a two-dimensional projection of the face key points on the three-dimensional face model and the obtained face key point of the face image sample. For example, in the present disclosure, a sum of distances between the face key point of the face image sample and two-dimensional face key points obtained by projecting the face key points of the three-dimensional face model subjected to parameter adjustment is optimized by using a gradient descent method or the like by adjusting the parameter of the three-dimensional face model, to make the sum of distances as small as possible. When the degree of matching or the sum of distances satisfies a predetermined requirement, the face posture information of the current three-dimensional face model is the face posture information of the face image sample.

In optional examples, the adjusting the parameter of the three-dimensional face model in the present disclosure may generally include adjusting a position of the three-dimensional face model and adjusting a posture of the three-dimensional face model (for example, adjusting Pitch, Yaw, and Roll of the three-dimensional face model). Further, the adjusting the parameter of the three-dimensional face model in the present disclosure may further include adjusting an expression of the three-dimensional face model, that is, adjusting a face key point in the three-dimensional face model highly correlated with the expression, for example, adjusting a face key point at a mouth position, or for another example, adjusting a face key point at an eye position, to improve a similarity between the expression of the three-dimensional face model and an expression reflected by the face key point of the face image sample. In the present disclosure, the expression of the three-dimensional face model is adjusted, which is conducive to optimize the sum of the distances between the face key point of the face image sample and the two-dimensional face key points obtained by projecting the face key points of the three-dimensional face model subjected to parameter adjustment, thereby improving the accuracy of face posture annotation information.

When the adjusting the parameter of the three-dimensional face model in the present disclosure includes adjusting the position of the three-dimensional face model, adjusting the posture of the three-dimensional face model, and adjusting the expression of the three-dimensional face model, the three-dimensional face model in the present disclosure may be referred to as a fine three-dimensional face model.

At S320, the face posture information of the face image sample is used as face posture annotation information of the face image sample, and is added to a training data set as one piece of training data together with the face key point of the face image sample.

In the embodiments, in the process of forming the training data, the face posture annotation information may be obtained by using the fine three-dimensional face model, which is conducive to guarantee the accuracy and reliability of the face posture annotation information. In addition, in the embodiments, the three-dimensional face model is used to generate the training data only in the process of training the neural network. After the training of the neural network is completed, the trained neural network can extract the face posture information based on a neuron parameter learned in the process of training the neural network, which is equivalent to "migrating" the fine three-dimensional face model to the neural network to some extent. In addition, because a processing speed is faster than the three-dimensional face model, an application requirement of analyzing the face posture information in real time can be better met.

Figure 5:
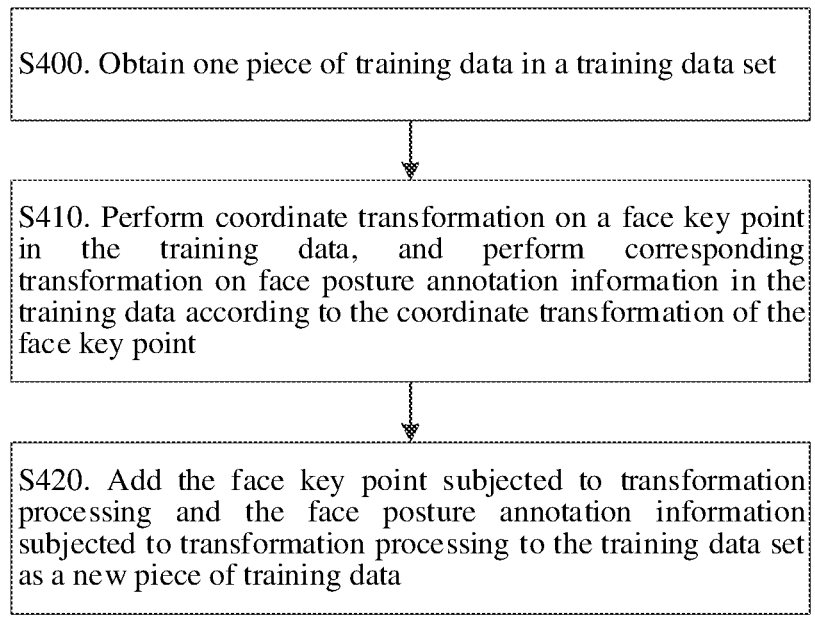
FIG. 5 is a flowchart of other implementations of forming training data according to the present disclosure.

FIG. 5 is a flowchart of another embodiment of forming training data in a training data set according to the present disclosure. As shown in FIG. 5, the method according to the embodiments includes operations of S400, S410, and S420. The operations in FIG. 5 are described in detail below.

At S400, one piece of training data in a training data set is obtained. The obtained piece of training data generally includes a face key point of the face image sample and face posture annotation information of the face image sample.

At S410, coordinate transformation is performed on the face key point of the face image sample in the piece of training data, and corresponding transformation is performed on the face posture annotation information of the face image sample in the piece of training data according to the coordinate transformation of the face key point of the face image sample.

In optional examples, the performing coordinate transformation on the face key point of the face image sample in the piece of training data may be: when a face is set to a front face (that is, the face faces towards a camera), and both Y-axis rotation information and Z-axis rotation information of the face key point indicate that there is no rotation (for example, the rotation angle is 0), mirroring processing is performed on an X-axis coordinate of the face key point of the face image sample in the piece of training data, and when the mirroring processing is performed, the performing corresponding transformation on the face posture annotation information of the face image sample in the piece of training data according to the coordinate transformation of the face key point in the present disclosure may be: separately negating the Y-axis rotation information and the Z-axis rotation information in the face posture annotation information in the piece of training data, for example, separately negating Yaw and Roll.

In optional examples, the performing coordinate transformation on the face key point of the face image sample in the piece of training data may be: rotating coordinates of the face key point of the face image sample in the piece of training data by a predetermined angle in two dimensions, and when the coordinates are rotated in two dimensions, the performing corresponding transformation on the face posture annotation information of the face image sample in the piece of training data according to the coordinate transformation of the face key point of the face image sample in the present disclosure may be: adjusting, according to the predetermined angle, the Z-axis rotation information in the face posture annotation information of the face image sample in the piece of training data, for example, increasing or reducing Roll by the predetermined angle.

At S420, the face key point of the face image sample and the face posture annotation information of the face image sample that are subjected to transformation processing are added to the training data set as a new piece of training data.

In the present disclosure, coordinate transformation is performed on the face key point of the face image sample in the training data, and corresponding transformation is performed on the face posture annotation information of the face image sample in the training data according to the coordinate transformation of the face key point, so that new training data can be conveniently formed to expand the training data set, and a to-be-trained neural network is trained by using abundant training data, thereby avoiding an overfitting phenomenon of the neural network.

Figure 6:
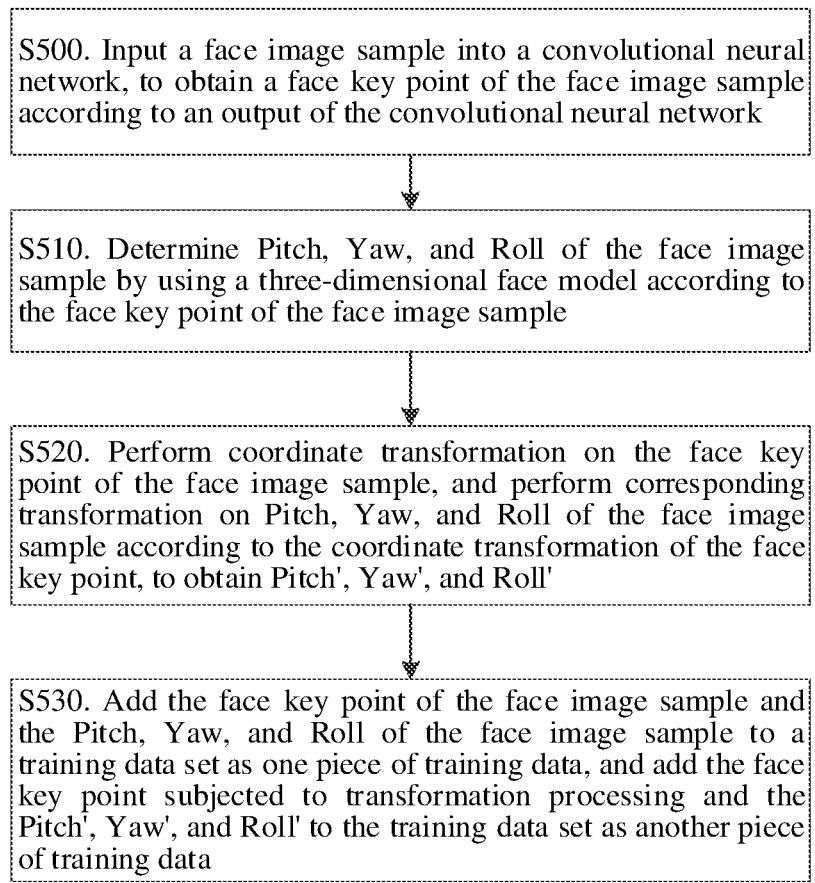
FIG. 6 is a flowchart of other implementations of forming training data according to the present disclosure.

FIG. 6 is a flowchart of still another embodiment of forming training data in a training data set according to the present disclosure. As shown in FIG. 6, the method according to the embodiments includes operations of S500, S510, S520, and S530. The operations in FIG. 6 are described in detail below.

At S500, a face image sample is input into a convolutional neural network, to obtain a face key point of the face image sample according to an output of the convolutional neural network.

At S510, Pitch, Yaw, and Roll of the face image sample are determined by using a three-dimensional face model according to the face key point of the face image sample. For an operation specifically performed in this operations, reference may be made to the descriptions of operation S310 above.

At S520, coordinate transformation is performed on the face key point of the face image sample, and corresponding transformation is performed on Pitch, Yaw, and Roll of the face image sample according to the coordinate transformation of the face key point, to obtain Pitch', Yaw', and Roll'. For an operation specifically performed in this operations, reference may be made to the descriptions of operation S410 above.

At S530, the face key point of the face image sample and Pitch, Yaw, and Roll of the face image sample are added to a training data set as one piece of training data, and the face key point subjected to the transformation processing and Pitch', Yaw', and Roll' are added to the training data set as another piece of training data. In the present disclosure, Pitch, Yaw, and Roll are formed by using a three-dimensional face model, which is conducive to guarantee the accuracy of the training data. By performing transformation processing on such training data, and adding the training data before and after the transformation to the training data set, the accuracy of the training data subjected to the transformation processing is ensured, the training data in the training data set is enriched, and the efficiency of forming the training data set is improved.

Figure 7:
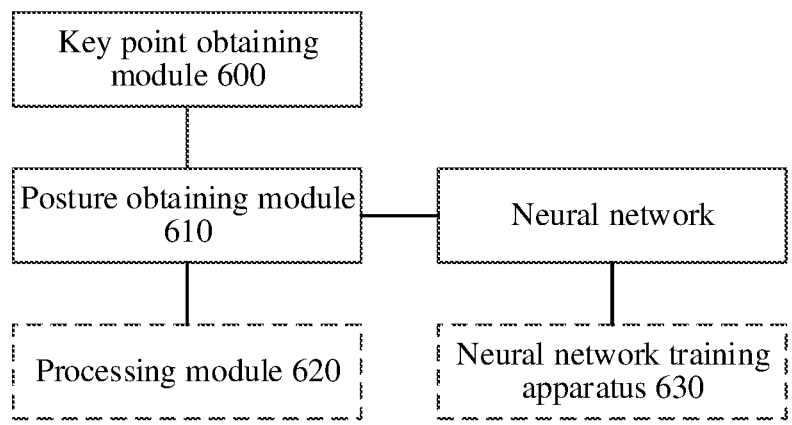
FIG. 7 is a schematic structural diagram of implementations of a face posture analysis apparatus according to the present disclosure.

FIG. 7 is a schematic structural diagram of one embodiment of a face posture analysis apparatus according to the present disclosure. As shown in FIG. 7, the apparatus according to the embodiments mainly includes a key point obtaining module 600 and a posture obtaining module 610. Optionally, the apparatus according to the embodiments may further include a processing module 620 and a neural network training apparatus 630.

The key point obtaining module 600 is mainly configured to obtain a face key point of a to-be-processed face image. For an operation specifically performed by the key point obtaining module 600, reference may be made to descriptions of S100 in FIG. 1 in the method implementations above. No repeated descriptions are provided here.

The posture obtaining module 610 is mainly configured to input the face key point of the to-be-processed face image into a neural network, to obtain face posture information of the to-be-processed face image output by the neural network. For an operation specifically performed by the posture obtaining module 610, reference may be made to descriptions of S110 in FIG. 1 in the method implementations above. No repeated descriptions are provided here.

The processing module 620 is mainly configured to process the to-be-processed face image according to the face posture information of the to-be-processed face image. The processing may include at least one of face recognition, face changing processing (for example, deformation processing in a partial face area or an entire area), face beautification processing (for example, wrinkle and freckle removal processing and the like), makeup processing (for example, eyebrow drawing processing and the like), face image rendering processing (for example, special effect processing for eyebrows and the like), face state detection processing (for example, determining an opening/closing degree of the eye/mouth and the like), expression detection processing (for example, determining an opening/closing degree of the eye/mouth and the like), fine positioning processing of organs (for example, eyelid line positioning or inner/outer lip line positioning for an upper/lower lip and the like), or driving state determining processing (for example, determining a distracted driving state or a fatigue driving state and the like).

The neural network training apparatus 630 is mainly configured to train a to-be-trained neural network by using training data in a training data set, and the training data includes the face key point and face posture annotation information. For an operation specifically performed by the neural network training apparatus 630, reference may be made to descriptions for FIG. 3 in the method implementations above. For a specific structure of the neural network training apparatus 630, reference may be made to descriptions for FIG. 8 in the method implementations above. No repeated descriptions are provided here.

In optional examples, in the present disclosure, a driving state monitoring apparatus may be implemented by using the face posture analysis apparatus above. That is, the driving state monitoring apparatus includes a face posture analysis apparatus and a driving state determining module. Optionally, the driving state monitoring apparatus may further include at least one of a first determining module, a second determining module, a third determining module, a fourth determining module, or a responding module.

The face posture analysis apparatus is configured to obtain face posture information of a driver image captured by an in-vehicle camera. Optionally, the face posture analysis apparatus obtains the driver image (for example, a driver image that includes a driver face) captured by the in-vehicle camera, and obtains a face key point of the driver image. For example, the face posture analysis apparatus inputs the driver image to a convolutional neural network, to obtain a face key point of the driver image output by the convolutional neural network. Then, the face posture analysis apparatus inputs the obtained face key point of the driver image into the neural network, to obtain face posture information of the driver image output by the neural network. For example, the face posture analysis apparatus obtains Pitch, Yaw, and Roll of the driver image that are output by the neural network.

The driving state determining module is configured to determine a driving state of a driver according to the face posture information of the driver image in a period of time. For example, when the driving state determining module determines, according to Pitch, Yaw, and Roll of the driver image in the period of time, that a deflection angle and a deflection duration of the driver's head in at least one direction satisfy a preset condition, it is determined that the driver is in a distracted driving state or a fatigue driving state.

In optional examples, the first determining module may determine an eye opening/closing action of the driver according to the face key point of the driver image in the period of time, and then the driving state determining module determines the driving state of the driver according to the face posture information of the driver image in the period of time and the eye opening/closing action. For example, when the driving state determining module determines, according to the driver image in the period of time, that a head lowering angle (Pitch) and lowering duration of the driver satisfy a preset condition, and a duration in which eyes are in a closed or semi-closed state reaches a threshold, it is determined that the driver is in a fatigue driving state.

In other optional examples, the second determining module may determine a mouth opening/closing action of the driver according to the face key point of the driver image in the period of time, and then the driving state determining module determines the driving state of the driver according to the face posture information of the driver image in the period of time and the mouth opening/closing action. For example, when the driving state determining module determines, according to the driver image in the period of time, that a deflection angle (Yaw) and a deflection duration of the driver's head to the left/right satisfy a preset condition, and the number of times that the mouth is open or closed reaches a threshold, it is determined that the driver is in a distracted driving state.

In other optional examples, the third determining module may determine a staying state of the driver's hand on a face area according to a hand key point of the driver image in the period of time, and then the driving state determining module determines the driving state of the driver according to the face posture information of the driver image in the period of time and the staying state. For example, when the driving state determining module determines, according to the driver image in the period of time, that a side deviation angle (Roll) or a head lowering angle (Pitch) obtained when the driver's head approaches one shoulder satisfies a preset condition, and a duration in which a hand stays near an ear or mouth area reaches a threshold, it is determined that the driver is in a distracted driving state.

In other optional examples, the fourth determining module may determine a face orientation of the driver according to the face key point of the driver image in the period of time. For example, the fourth determining module may determine the face orientation according to a visible face key point and an invisible face key point. Then, the driving state determining module determines the driving state of the driver according to the face posture information of the driver image in the period of time and the face orientation. For example, when the driving state determining module determines, according to the driver image in the period of time, that a deflection angle (Yaw) and a deflection duration of the driver's head to the left/right satisfy a preset condition, and the face also continuously faces towards the left/right, it is determined that the driver is in a distracted driving state.

In addition, the driving state determining module may combine determining conditions used for determining in the different examples above. For example, when the driving state determining module determines, according to the driver image in the period of time, that a side deviation angle (Roll) or a head lowering angle (Pitch) obtained when the driver's head approaches one shoulder satisfies a preset condition, a duration in which a hand stays near an ear or mouth area reaches a threshold, and the number of times that the mouth is opened or closed reaches a threshold, it is determined that the driver is in a distracted driving state of using a mobile phone.

The responding module is configured to: in response to a fact that the driving state of the driver satisfies a predetermined alarm condition (for example, the driver is in a severely distracted driving state or in a severely tired driving state), perform a corresponding operation, to facilitate safe driving. For example, the responding module performs an operation of outputting alarm prompt information. For another example, the responding module performs an operation of sending information to a cloud server or a predetermined associated communication terminal (such as a mobile phone of the driver or a mobile phone of a driver manager). The information sent by the responding module may include the driving state of the driver, at least one driver image frame corresponding to the driving state of the driver, and the like.

Figure 8:
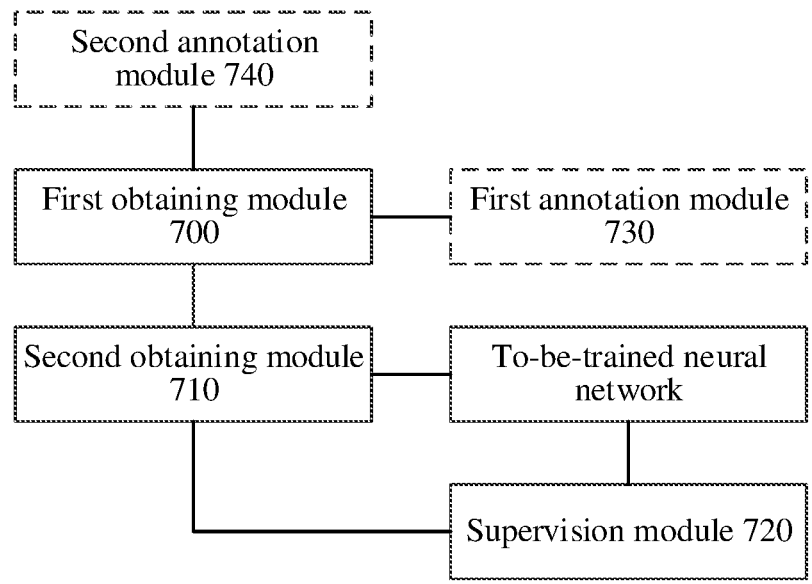
FIG. 8 is a schematic structural diagram of implementations of a neural network training apparatus according to the present disclosure.

FIG. 8 is a schematic structural diagram of one embodiment of a neural network training apparatus according to the present disclosure. As shown in FIG. 8, the apparatus according to the embodiments mainly includes a first obtaining module 700, a second obtaining module 710, and a supervision module 720. Optionally, the apparatus according to the embodiments may further include a first annotation module 730 and a second annotation module 740.

The first obtaining module 700 is mainly configured to obtain training data from a training data set. For an operation specifically performed by the first obtaining module 700, reference may be made to descriptions of S200 in FIG. 3 in the method implementations above. No repeated descriptions are provided here.

The second obtaining module 710 is mainly configured to input a face key point in the training data into a to-be-trained neural network, to obtain face posture information output by the to-be-trained neural network. For an operation specifically performed by the second obtaining module 710, reference may be made to descriptions of S210 in FIG. 3 in the method implementations above. No repeated descriptions are provided here.

The supervision module 720 is mainly configured to perform supervised learning on the to-be-trained neural network by using a difference between the face posture information output by the to-be-trained neural network and face posture annotation information in the training data as guidance information. For an operation specifically performed by the supervision module 720, reference may be made to descriptions of S220 in FIG. 3 in the method implementations above. No repeated descriptions are provided here.

The first annotation module 730 is mainly configured to: obtain a face key point of a face image sample, and determine face posture annotation information of the face image sample by using a three-dimensional face model according to the face key point of the face image sample. The face key point of the face image sample and the face posture annotation information of the face image sample are used as one piece of training data in the training data set. For an operation specifically performed by the first annotation module 730, reference may be made to descriptions of S300 to S310 in FIG. 4 and S500 to S510 in FIG. 6 in the method implementations above. No repeated descriptions are provided here.

The second annotation module 740 is mainly configured to: obtain one piece of training data in the training data set, perform coordinate transformation on a face key point in the training data, and perform corresponding transformation on face posture annotation information in the training data according to the coordinate transformation of the face key point; and add the face key point subjected to transformation processing and the face posture annotation information subjected to transformation processing to the training data set as a new piece of training data. For an operation specifically performed by the second annotation module 740, reference may be made to descriptions of S410 in FIG. 5 and S520 in FIG. 6 in the method implementations above. No repeated descriptions are provided here.

Exemplary Device

Figure 9:
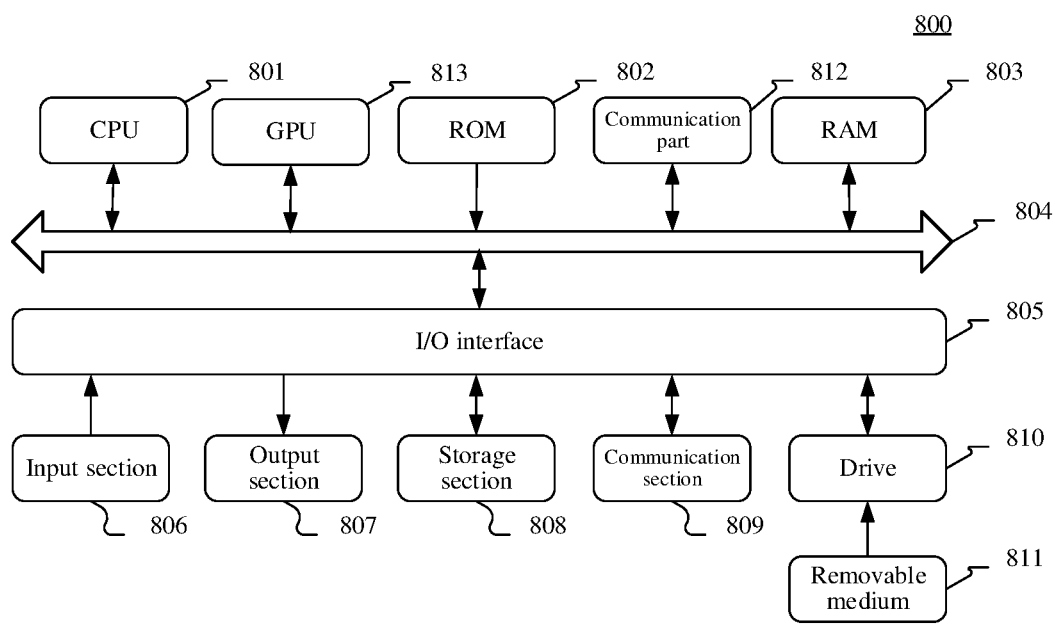
FIG. 9 is a block diagram of one exemplary device for implementing implementations of the present disclosure.

FIG. 9 shows an exemplary device 800 applicable to implement the present disclosure. The device 800 may be a control system/electronic system configured in an automobile, a mobile terminal (such as an intelligent mobile phone), a Personal Computer (PC) (such as a desktop computer or a notebook computer), a tablet computer, a server, or the like. In FIG. 9, the device 800 includes one or more processors, a communication part, and the like.

The one or more processors may be one or more Central Processing Units (CPUs) 801, and/or one or more Graphics Processing Units (GPUs) 813 or the like that perform face posture analysis by using a neural network. The processor may execute various appropriate actions and processing according to executable instructions stored in a Read-Only Memory (ROM) 802 or executable instructions loaded from a storage section 808 into a Random Access Memory (RAM) 803. The communication part 812 may include, but is not limited to, a network card. The network card may include, but is not limited to, an IB (Infiniband) network card. The processor is communicated with the ROM 802 and/or the RAM 803 to execute executable instructions, is connected to the communication part 812 by means of a bus 804, and is communicated with other target devices by means of the communication part 812, thereby completing corresponding operations according to the present disclosure.

For operations performed by the foregoing instructions, reference may be made to related descriptions in the foregoing method embodiments. Details are not described herein again. In addition, the RAM 803 may further store various programs and data required for operations of an apparatus. The CPU 801, the ROM 802, and the RAM 803 are connected to each other via the bus 804. In the case that the RAM 803 exists, the ROM 802 is an optional module. The RAM 803 stores executable instructions, or writes executable instructions to the ROM 802 during running. The executable instructions cause the CPU 801 to perform the operations included in the foregoing methods.

An Input/Output (I/O) interface 805 is also connected to the bus 804. The communication part 812 is integrated, or is configured to have multiple sub-modules (for example, multiple IB network cards) separately connected to the bus. The following components are connected to the I/O interface 805: an input section 806 including a keyboard, a mouse, and the like; an output section 807 including a Cathode-Ray Tube (CRT), a Liquid Crystal Display (LCD), a speaker, and the like; the storage section 808 including a hard disk and the like; and a communication section 809 of a network interface card including an LAN card, a modem, and the like. The communication section 809 performs communication processing via a network such as the Internet. A drive 810 is also connected to the I/O interface 805 according to requirements. A removable medium 811 such as a magnetic disk, an optical disk, a magneto-optical disk, a semiconductor memory or the like is mounted on the drive 810 according to requirements, so that a computer program read from the removable medium is installed on the storage section 808 according to requirements.

It should be specially noted that the architecture shown in FIG. 9 is merely an optional implementation. During specific practice, the number and types of the components in FIG. 9 are selected, decreased, increased, or replaced according to actual requirements. Different functional components are separated or integrated or the like. For example, the GPU and the CPU are separated. For another example, the GPU is integrated on the CPU, and the communication part is separated from or integrated on the CPU or the GPU or the like. These alternative implementations all fall within the scope of protection of the present disclosure. Particularly, a process described above with reference to a flowchart according to the implementations of the present disclosure is implemented as a computer software program. For example, the implementations of the present disclosure include a computer program product, which includes a computer program tangibly contained on a machine-readable medium. The computer program includes a program code for executing the method shown in the flowchart. The program code may include corresponding instructions for correspondingly executing the operations of the methods provided according to the present disclosure. In such embodiments, the computer program is downloaded and installed from the network by means of the communication section 809 and/or is installed from the removable medium 811. The computer program, when being executed by the CPU 801, executes the foregoing instructions recorded in the present disclosure for implementing the corresponding operations above.

In one or more optional implementations, embodiments of the present disclosure further provide a computer program product, configured to store a computer readable instruction, where when the instruction is executed, the computer executes the face posture analysis method, the neural network training method, or the driving state monitoring method in any one of the foregoing embodiments. The computer program product may be specifically implemented by hardware, software, or a combination thereof. In one optional example, the computer program product is specifically embodied as a computer storage medium. In another optional example, the computer program product is specifically embodied as a software product, such as a Software Development Kit (SDK).

In one or more optional implementations, the embodiments of the present disclosure further provide another face posture analysis method, neural network training method, driving state monitoring method, and corresponding apparatuses, electronic devices, computer storage mediums, computer programs, and computer program products. The method includes: sending, by a first apparatus, a face posture analysis instruction, a training neural network instruction, or a driving state monitoring instruction to a second apparatus, where the instruction causes the second apparatus to perform the face posture analysis method, the training neural network method, or the driving state monitoring method in any one of the foregoing possible embodiments; and receiving, by the first apparatus, a face posture analysis result, a neural network training result, or a driving state monitoring result sent by the second apparatus.

In some embodiments, the face posture analysis instruction, the training neural network instruction, or the driving status monitoring instruction may be specifically an invoking instruction. The first apparatus may instruct, through invoking, the second apparatus to perform a face posture analysis operation, a neural network training operation, or a driving state monitoring operation. Correspondingly, in response to receiving the invoking instruction, the second apparatus may perform the operations and/or procedures in any embodiment of the face posture analysis method, the neural network training method, or the driving state monitoring method.

It should be understood that the terms such as "first" and "second" in the embodiments of the present disclosure are merely for distinguishing, and should not be construed as a limitation on the embodiments of the present disclosure. It should be further understood that in the present disclosure, "multiple" may mean two or more, and "at least one" may mean one, or two or more.

It should also be understood that any component, data, or structure mentioned in the present disclosure may be generally understood as one or more when no specific limitation is imposed or no reverse enlightenment is given above or below.

It should be further understood that descriptions of the embodiments in the present disclosure emphasize differences between the embodiments. For a same or similar part, reference may be made to each other. For brevity, details are not described again.

The methods and apparatuses, the electronic device, and the computer-readable storage medium in the present disclosure may be implemented in many manners. For example, the methods and apparatuses, the electronic device, and the computer-readable storage medium in the present disclosure may be implemented with software, hardware, firmware, or any combination of software, hardware, and firmware. The foregoing specific sequence of operations of the method is merely for description, and unless otherwise stated particularly, is not intended to limit the operations of the method in the present disclosure. In addition, in some implementations, the present disclosure may also be implemented as programs recorded in a recording medium. These programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to persons of ordinary skills in the art. The implementations are selected and described to better describe the principle and actual application of the present disclosure, and to make persons of ordinary skills in the art understand the embodiments of the present disclosure, so as to design various implementations with various modifications applicable to particular use.

The invention claimed is:

1. A face posture analysis method, comprising:
   obtaining a face key point of a face image; and
   inputting the face key point of the face image into a neural network, and obtaining face posture information of the face image output by the neural network, wherein the neural network is obtained through pre-training based on training data that comprises a face key point of a face image sample and face posture annotation information of the face image sample, and
   the neural network comprises at least two fully connected layers with a rectified linear unit and one fully connected layer that is used as an output layer.

2. The method according to claim 1, wherein the face posture information comprises at least one of:
   X-axis rotation information, wherein the X-axis rotation information comprises an angle of rotation around an X-axis;
   Y-axis rotation information, wherein the Y-axis rotation information comprises an angle of rotation around a Y-axis; or
   Z-axis rotation information, wherein the Z-axis rotation information comprises an angle of rotation around a Z-axis.

3. The method according to claim 1, wherein the obtaining a face key point of a face image comprises:
   obtaining the face key point of the face image by using a convolutional neural network,
   wherein the inputting the face key point of the face image into a neural network comprises:
   performing normalization processing on coordinates of the face key point of the face image, and inputting a face key point subjected to the coordinate normalization processing into the neural network.

4. The method according to claim 1, further comprising:
   processing the face image according to the face posture information of the face image, wherein
   the processing comprises at least one of face recognition, face changing processing, face beautification processing, facial makeup processing, face image rendering processing, face state detection processing, expression detection processing, fine positioning processing of organs, or driving state determination processing.

5. The method according to claim 1, wherein the neural network is obtained by using a training manner comprising:
   obtaining the training data from a training data set;
   inputting the face key point of the face image sample in the training data into a to-be-trained neural network, and obtaining face posture information of the face image sample output by the to-be-trained neural network; and
   performing supervised learning on the to-be-trained neural network by using a difference between the face posture information of the face image sample output by the to-be-trained neural network and the face posture annotation information of the face image sample in the training data as guidance information.

6. The method according to claim 5, wherein the training data in the training data set is generated by:
   obtaining the face key point of the face image sample; and
   determining the face posture annotation information of the face image sample by using a three-dimensional face model according to the face key point of the face image sample; wherein
   the face key point of the face image sample and the face posture annotation information of the face image sample are used as one piece of the training data in the training data set.

7. The method according to claim 6, wherein the determining the face posture annotation information of the face image sample by using a three-dimensional face model according to the face key point of the face image sample comprises:

adjusting at least one parameter of the three-dimensional face model according to a gradient descent method, to optimize a sum of distances between the face key point of the face image sample and two-dimensional face key points obtained by projecting face key points of a three-dimensional face model subjected to parameter adjustment, so as to determine the face posture annotation information of the face image sample, wherein the adjusting at least one parameter of the three-dimensional face model comprises:

adjusting at least one of a position of the three-dimensional face model, a posture of the three-dimensional face model, or an expression of the three-dimensional face model.

8. The method according to claim 5, wherein the training data in the training data set is generated by:

obtaining one piece of training data in the training data set, performing coordinate transformation on a face key point of a face image sample in the piece of training data, and performing corresponding transformation on face posture annotation information of the face image sample in the piece of training data according to the coordinate transformation of the face key point of the face image sample in the piece of training data; and adding a face key point of the face image sample subjected to the coordinate transformation and face posture annotation information of the face image sample subjected to the corresponding transformation to the training data set as a new piece of training data.

9. The method according to claim 8, wherein when a face is set to a front face, both X-axis rotation information and Y-axis rotation information of the face key point indicate that there is no rotation of the face, and the performing coordinate transformation on a face key point of a face image sample in the piece of training data, and performing corresponding transformation on face posture annotation information of the face image sample in the piece of training data according to the coordinate transformation of the face key point of the face image sample in the piece of training data comprises:

performing mirroring processing on an X-axis coordinate of the face key point of the face image sample in the piece of training data, and separately negating X-axis rotation information and Y-axis rotation information of the face image sample in the face posture annotation information in the piece of training data.

10. The method according to claim 8, wherein the performing coordinate transformation on a face key point of a face image sample in the piece of training data, and performing corresponding transformation on face posture annotation information of the face image sample in the piece of training data according to the coordinate transformation of the face key point of the face image sample in the piece of training data comprises:

rotating coordinates of the face key point of the face image sample in the piece of training data by a predetermined angle in two dimensions, and adjusting Z-axis rotation information in the face posture annotation information of the face image sample in the piece of training data according to the predetermined angle.

11. The method according to claim 1, wherein the face image is of a driver and is captured by an in-vehicle camera; and the method further comprises determining a driving state of the driver according to face posture information of the face image of the driver in a period of time, wherein the driving state comprises at least one of a distracted driving state or a fatigue driving state.

12. The method according to claim 11, further comprising:

determining an eye opening/closing action of the driver according to a face key point of the face image of the driver in the period of time;

the determining a driving state of the driver according to face posture information of the face image of the driver in a period of time comprises:

determining the driving state of the driver according to the face posture information of the face image of the driver in the period of time and an eye opening/closing action.

13. The method according to claim 11, further comprising:

determining a mouth opening/closing action of the driver according to a face key point of the face image of the driver in the period of time;

the determining a driving state of the driver according to face posture information of the face image of the driver in a period of time comprises:

determining the driving state of the driver according to the face posture information of the face image of the driver in the period of time and the mouth opening/closing action.

14. The method according to claim 11, further comprising:

obtaining a hand key point of the face image of the driver; and determining a staying state of a hand of the driver on a face area according to a face key point and the hand key point of the face image of the driver in the period of time;

the determining a driving state of the driver according to face posture information of the face image of the driver in a period of time comprises:

determining the driving state of the driver according to the face posture information of the face image of the driver in the period of time and the staying state.

15. The method according to claim 11, further comprising:

determining a face orientation of the driver according to a face key point of the face image of the driver in the period of time;

the determining a driving state of the driver according to face posture information of the face image of the driver in a period of time comprises:

determining the driving state of the driver according to the face posture information of the face image of the driver in the period of time and the face orientation.

16. The method according to claim 11, wherein after the determining a driving state of the driver, the method further comprises:

in response to the driving state of the driver satisfying a predetermined alarm condition, performing at least one of the following operations:

outputting alarm prompt information; or sending information to a cloud server or a predetermined associated communication terminal, wherein the sent information comprises at least one of the following information: the driving state of the driver or at least one frame of face image of the driver corresponding to the driving state of the driver.

17. An electronic device, comprising:

a memory, configured to store computer programs; and a processor, configured to execute the computer programs stored in the memory, wherein the computer programs, when being executed by the processor, cause the processor to implement a face posture analysis method, the method comprising:

obtaining a face key point of a face image; and inputting the face key point of the face image into a neural network, and obtaining face posture information of the face image output by the neural network, wherein the neural network is obtained through pre-training based on training data that comprises a face key point of a face image sample and face posture annotation information of the face image sample, and the neural network comprises at least two fully connected layers with a rectified linear unit and one fully connected layer that is used as an output layer.

18. A non-transitory computer-readable storage medium, having computer programs stored thereon, wherein the computer programs, when being executed by a processor, implement a face posture analysis method, the method comprising:

obtaining a face key point of a face image; and inputting the face key point of the face image into a neural network, and obtaining face posture information of the face image output by the neural network, wherein the neural network is obtained through pre-training based on training data that comprises a face key point of a face image sample and face posture annotation information of the face image sample, and the neural network comprises at least two fully connected layers with a rectified linear unit and one fully connected layer that is used as an output layer.

* * * * *